(12) United States Patent
Allinger et al.

(10) Patent No.: US 12,383,769 B2
(45) Date of Patent: Aug. 12, 2025

(54) MOBILE RESCUE DEVICE AS WELL AS COMPUTER-IMPLEMENTED METHOD FOR THEFT PROTECTION OF THE MOBILE RESCUE DEVICE

(71) Applicant: WEBER-HYDRAULIK GMBH, Losenstein (AT)

(72) Inventors: Patrick Allinger, Steyr (AT); Hanno Diekmann, Vaihingen/Enz (DE); Josef Eder, Schiedlberg (AT)

(73) Assignee: WEBER-HYDRAULIK GMBH, Losenstein (AT)

( * ) Notice: Subject to any disclaimer, the term of this patent is extended or adjusted under 35 U.S.C. 154(b) by 508 days.

(21) Appl. No.: 17/194,418

(22) Filed: Mar. 8, 2021

(65) Prior Publication Data
US 2021/0283430 A1 Sep. 16, 2021

(30) Foreign Application Priority Data

Mar. 10, 2020 (AT) .............................. A 50198/2020

(51) Int. Cl.
| | |
|---|---|
| *A62B 3/00* | (2006.01) |
| *F16P 3/00* | (2006.01) |
| *F16P 7/00* | (2006.01) |
| *H04W 4/80* | (2018.01) |
| *H04W 12/63* | (2021.01) |

(52) U.S. Cl.
CPC .............. *A62B 3/005* (2013.01); *F16P 3/008* (2013.01); *F16P 7/00* (2013.01); *H04W 4/80* (2018.02); *H04W 12/63* (2021.01)

(58) Field of Classification Search
CPC . A62B 3/005; F16P 3/008; F16P 7/00; H04W 4/80
See application file for complete search history.

(56) References Cited

U.S. PATENT DOCUMENTS

| | | | |
|---|---|---|---|
| 7,568,372 B1 | 8/2009 | Patton et al. | |
| 8,788,635 B2* | 7/2014 | Reus ....................... | G06F 21/88 |
| | | | 709/204 |
| 9,467,862 B2 | 10/2016 | Zeiler et al. | |
| 10,724,926 B2* | 7/2020 | Chen ................... | G01R 31/3835 |
| 10,769,315 B2* | 9/2020 | Velusamy ........... | H04W 12/126 |
| 10,854,054 B2* | 12/2020 | Esenwein ................ | B25F 5/00 |

(Continued)

FOREIGN PATENT DOCUMENTS

| | | | |
|---|---|---|---|
| AT | 520046 A1 | 12/2018 | |
| CN | 110084932 A * | 8/2019 | ........... H04L 67/125 |

(Continued)

OTHER PUBLICATIONS

Machine Translation for CN-110084932-A, obtained Jun. 2025 (Year: 2025).*

(Continued)

*Primary Examiner* — Robert E Fennema
*Assistant Examiner* — Vi N Tran
(74) *Attorney, Agent, or Firm* — Collard and Roe, P.C.

(57) ABSTRACT

A mobile rescue device, in particular a spreading device, includes a cutting device, or a combined device having a spreading and a cutting function, including a base body and a working device arranged at the base body. At the mobile rescue device, a deactivation device is formed for deactivating the working device in the event of theft.

21 Claims, 2 Drawing Sheets

(56) References Cited

U.S. PATENT DOCUMENTS

| | | | |
|---|---|---|---|
| 11,016,481 B2* | 5/2021 | Gustavsson | A01D 34/008 |
| 11,665,519 B2* | 5/2023 | Brault | H01M 50/247 |
| | | | 700/286 |
| 2005/0073389 A1* | 4/2005 | Chandley | G06F 21/554 |
| | | | 340/5.31 |
| 2007/0296589 A1* | 12/2007 | Cullum | G08B 13/1409 |
| | | | 340/572.1 |
| 2009/0251330 A1 | 10/2009 | Gerold et al. | |
| 2013/0109375 A1* | 5/2013 | Zeiler | H04W 12/126 |
| | | | 455/552.1 |
| 2014/0107853 A1 | 4/2014 | Ashinghurst et al. | |
| 2014/0158389 A1* | 6/2014 | Ito | B25F 5/00 |
| | | | 173/46 |
| 2015/0286209 A1* | 10/2015 | Kreuzer | B25F 5/00 |
| | | | 700/175 |
| 2016/0048122 A1* | 2/2016 | Lukosz | G05B 19/4183 |
| | | | 700/114 |
| 2017/0057040 A1 | 3/2017 | Rzasa et al. | |
| 2017/0201853 A1 | 7/2017 | Chen et al. | |
| 2017/0252911 A1 | 9/2017 | Barezzani et al. | |
| 2018/0154537 A1 | 6/2018 | Lu | |
| 2018/0361559 A1 | 12/2018 | Bantle et al. | |
| 2019/0022388 A1* | 1/2019 | Stucke | A61N 1/36031 |
| 2019/0027002 A1 | 1/2019 | Esenwein et al. | |
| 2019/0053032 A1 | 2/2019 | Coulis et al. | |
| 2019/0083821 A1* | 3/2019 | Sauerbier | A62B 3/005 |
| 2020/0043321 A1 | 2/2020 | Huggins et al. | |
| 2022/0262274 A1 | 8/2022 | Kirchner | |

FOREIGN PATENT DOCUMENTS

| | | |
|---|---|---|
| DE | 102008000973 A1 | 10/2009 |
| DE | 10 2015 226 090 A1 | 6/2017 |
| DE | 10 2016 201 497 A1 | 8/2017 |
| DE | 10 2018 114 014 A1 | 12/2019 |
| DE | 102019217341 A1 | 5/2021 |
| EP | 3 009 310 A1 | 4/2016 |
| EP | 3 238 880 A1 | 11/2017 |
| ES | 1 154 011 U | 4/2016 |
| WO | 2017/190799 A1 | 11/2017 |
| WO | 2018/227222 A1 | 12/2018 |
| WO | 2019058138 A1 | 3/2019 |

OTHER PUBLICATIONS

XP054979663, Killerdrone! Flying chainsaw, published Mar. 31, 2016 (https://www.youtube.com/watch?v=6Viwwetf0gU).

XP054982360, Remote Control Chainsaw (Husqvarna 266xp), published on Oct. 6, 2010.

* cited by examiner

MOBILE RESCUE DEVICE AS WELL AS COMPUTER-IMPLEMENTED METHOD FOR THEFT PROTECTION OF THE MOBILE RESCUE DEVICE

CROSS REFERENCE TO RELATED APPLICATIONS

Applicant claims priority under 35 U.S.C. § 119 of Austrian Application No. A 50198/2020 filed Mar. 10, 2020, the disclosure of which is incorporated by reference.

BACKGROUND OF THE INVENTION

Field of the Invention

The invention relates to a mobile rescue device as well as a computer-implemented method for theft protection of the mobile rescue device.

From AT 520046 A1, a mobile rescue device in its generic form is known. Such rescue devices are required to have a robust and thus simple structure and to exert high forces in order to be able to plastically deform various materials. As a result, the mobile rescue device is not only used for the intended rescue purposes but increasingly also for criminal purposes. As it is not possible for private individuals, or only with difficulty, to obtain such mobile rescue devices, it happens more and more frequently that mobile rescue devices are stolen from rescue organizations, especially from fire departments. With these stolen mobile rescue devices, cash machines or doors are subsequently often broken open.

SUMMARY OF THE INVENTION

It was the object of the present invention to prevent use of the mobile rescue device for criminal purposes to the greatest possible extent.

This object is achieved by a device and a method according to the claims.

According to the invention, a mobile rescue device, in particular a spreading device, a cutting device, or a combined device having a spreading and a cutting function, is formed. Mobile rescue device comprises:

a base body, a working means arranged at the base body.

Furthermore, at the mobile rescue device, a deactivation means is formed for deactivating the working means in the event of theft.

The rescue device according to the invention has the advantage that via the deactivation means, the functionality of the mobile rescue device may be disabled, which may prevent misuse of the mobile rescue device.

It may further be provided that a position detection means is formed at the mobile rescue device. This has the advantage that by means of the position detection means, the position of the mobile rescue device may be detected; this way, a particular action may be set when the mobile rescue device leaves a predefined radius of movement and/or the current location of the mobile rescue device may be retrieved. Thus, in the event of theft, misuse of the mobile rescue device may be prevented to the greatest possible extent.

It may further be appropriate if the position detection means is coupled with a position transmission unit configured for sending to a receiver a position signal detected by means of the position detection means. This way, the position signal detected by the position detection means may be transmitted to the receiver, whereby the current position of the mobile rescue device may be displayed at the receiver and appropriate actions may thus be taken for recovering the mobile rescue device or disabling the mobile rescue device.

It may further be provided that the position detection means and/or the deactivation means and/or the position transmission unit is built-in in the base body and not accessible without using a tool. This has the advantage that in the event of theft of the mobile rescue device, the position detection means and/or the deactivation means and/or the position transmission unit can neither be easily found nor easily removed from the mobile rescue device. Thus, especially in the case of unexperienced thieves, it may be prevented that the deactivation function or the locating function for the mobile rescue device can be deactivated.

It may further be provided that the position detection means is coupled with a position detection means energy storage, which is coupled with a main energy storage, wherein the main energy storage serves for supplying the driving energy for the driving means. This way, it may be achieved that the position detection means may be continuously supplied with sufficient energy, wherein during charging of the main energy storage, the position detection means energy storage is automatically charged as well. If, in the event of theft of the mobile rescue device, the main energy storage is removed, the position detection means energy storage may ensure that the position detection means or a possible related transmission unit may still be supplied with sufficient energy for transmitting a position signal of the mobile rescue device to a receiver for a certain period of time, preferably several days.

An embodiment is also advantageous according to which it may be provided that the deactivation means is coupled with an unlocking receiver, which may be controlled from a central server. This way, the mobile rescue device may be activated from a central alarm server, so that the functionality of the mobile rescue device is only provided if a mission or an exercise is actually conducted. This way, misuse of the mobile rescue device within the regular area of operations may also be prevented.

It may further be provided that the deactivation means is coupled with a display means, such as a display, so that the missing functionality of the working means may be displayed on the display means. On the one hand, this has the advantage that thieves leave the mobile rescue device behind when they recognize this notification and that the mobile rescue device may therefore be found at the place where it was left behind and used again by the emergency personnel. Moreover, the display means may serve for signaling to emergency personnel that the functionality of the working means must be unlocked before a mission is conducted.

According to a special embodiment, it is possible that a motion sensor is formed, by means of which the position detection means and/or the transmission unit may be activated. This way, the position detection means and/or the transmission unit may be put into hibernation mode, so that during everyday storage of the device in an emergency vehicle or an operations center, power consumption may be kept as low as possible. Only when the mobile rescue device is moved is the position detection means and/or the transmission unit activated, which results in increased power consumption.

According to the invention, a method for theft protection of a mobile rescue device, in particular a spreading device, a cutting device, or a combined device having a spreading and a cutting function, having a base body and a working means arranged at the base body, is provided.

In a method step of a theft scenario, the functionality of the working means of the mobile rescue device may be disabled by means of a deactivation means.

The method according to the invention has the advantage that through the method step of a theft scenario, where the functionality of the working means of the mobile rescue device may be disabled by means of a deactivation means, misuse of the mobile rescue device may be prevented.

Furthermore, it may be provided that in the theft scenario, position data on the current location of the mobile rescue device is detected by means of a position detection means. This has the advantage that in the theft scenario, the mobile rescue device, at least internally, has its position data available, for example in order to disable the functionality of the working means based on the position data. In addition, in the theft scenario, the mobile rescue device may be located by means of the position detection means; this way, it may be found and brought back easier.

It may further be provided that the theft scenario is activated when the position detection means detects that the mobile rescue device is moved outside predefined limits of movement and the functionality of the working means is automatically disabled. This has the advantage that the functionality of the working means and thus the functionality of the mobile rescue device is disabled without additional intervention by monitoring personnel or an operator in order to prevent misuse of the mobile rescue device directly and without any delay.

In an alternative embodiment, it may be provided that by means of an external additional input means, a deactivation command is transmitted to the deactivation means in order to disable the functionality of the working means in the theft scenario. This has the advantage that a deliberate input by an operator is required for disabling the functionality of the working means, which may prevent the functionality of the working means from being automatically disabled due to a software error.

According to an advantageous further development, it may be provided that by means of an external additional input means, an activation command is transmitted to the deactivation means for reactivating the functionality of the working means after the theft scenario has been terminated. This way, the mobile rescue device may be used again as intended after the theft.

In particular, it may advantageous if an electronic key, such as entering a code, is required for reactivating the functionality of the working means. This has the advantage that the functionality of the working means cannot be reactivated by the thief himself.

It may further be provided that when the theft scenario is activated, a notification is automatically transmitted to a receiver. This has the advantage that the owner or carrier of the receiver, such as a functionary of the rescue organization, is informed of the theft and may thus, for example, report the theft to the police, and is additionally informed that the mobile rescue device is not available for any missions.

Moreover, it may be provided that when the theft scenario is activated, the position data on the current location of the mobile rescue device is automatically transmitted to a receiver. This way, the exact location of the stolen mobile rescue device may be determined.

An embodiment is also advantageous according to which it may be provided that when the theft scenario is activated, an optical and/or acoustic signal is emitted by the mobile rescue device. This has the advantage that a potential thief is informed that the mobile rescue device is equipped with theft protection, which may at best result in the mobile rescue device being left behind at the place of theft and thus continuing to be available to the emergency personnel. In particular, it is conceivable that the acoustic signal is loud enough to have the effect of an alarm and makes it impossible for a thief to commit a crime with the mobile rescue device without attracting attention.

An electronic key within the meaning of this document may be a code, which is directly entered into an input terminal which is directly arranged at the mobile rescue device or into an input terminal arranged at the external additional input means. An electronic key may further be configured as a physical object, such as an RFID chip or a smartphone, for example with NFC functionality.

Theft protection within the meaning of this document may not only be understood as protection of the mobile rescue device against theft but also as protection of the mobile rescue device against use where a theft has already occurred.

To contain the above-mentioned problems of theft of the mobile rescue devices or misuse of the mobile rescue devices in the best possible way, the following solutions are available, in summary.

A first solution is early detection of the theft by means of a GPS arranged at the mobile rescue device, which GPS transmits the GPS signal to a predefinable receiver.

Another solution is equipping the mobile rescue device with monitoring via WLAN. Thus, an existing WLAN at a fire station, with which the mobile rescue device is coupled, may be used. If the mobile rescue device is taken or removed from the WLAN although no mission and no exercise scenario was initiated beforehand, this may be recognized as an event of theft, and a theft scenario may thus be activated. Based on this solution, another means, such as an RFID chip, a motion sensor or a specifically configured charging cable may of course also be used for recognizing when the mobile rescue device is taken out of its storage position.

In the event of theft, the mobile rescue device, in particular the working means of the mobile rescue device, may be deactivated by means of a deactivation means, so that the mobile rescue device is not available for committing a criminal act.

In addition, continuous transmission of the location of the mobile rescue device can be performed, which is carried out via a position signal, which is detected by a position detection means and transmitted to the receiver. This simplifies police investigation.

In the case of a new rescue device, the above-described features and functions of the mobile rescue device may be integrated into said device and thus be available from the beginning.

It is further also conceivable that the above-described features and functions are added subsequently to mobile rescue devices that have already been delivered and put on the market. In this regard, it is conceivable that a structurally independent theft module is formed, in which the deactivation means and/or the position detection means and/or the transmission unit is arranged.

It is further also conceivable that the mobile rescue device is connected to the internet via a data interface, such as mobile radio or WLAN, wherein various settings, such as determining the usual area of movement of the mobile rescue device, activating or deactivating the working means of the mobile rescue device, and the like, may be made via an online portal.

In particular, it may be provided that the owner of the mobile rescue device registers it via an online portal, and authorized users are created there. In the event of theft of the mobile rescue device, these authorized users may automatically receive a notification to a receiver. This may, for example, be an email, a push message, an SMS, a WhatsApp message, a call, an alarm on a pager and the like.

If the mobile rescue device now leaves this predefined radius of action, a corresponding message may be transmitted to the authorized users entered in the portal. In addition, the functionality of the working means may be locked either automatically or by one of the authorized users. Furthermore, the current position of the mobile rescue device may, for example, be displayed or tracked via the online portal as well.

For additional protection, it is also conceivable that the theft scenario is activated and the functionality of the working means is thus deactivated when an attempt is made to remove the deactivation means or the position detection means from the mobile rescue device. This may, for example, be done when a cable for power supply of these devices is disconnected. It is further also conceivable that the theft scenario is activated when the mobile rescue device does not have a mobile radio connection over a presettable period of time.

A mobile rescue device within the meaning of this document is an electromechanical or electrohydraulic working device for portable use in rescue missions, such as a spreading device, a cutting device, or a combined device having a spreading and a cutting function, or a lifting cylinder (or rescue cylinder). Such rescue devices primarily serve for supporting rescue organizations performing recovery operations, such as fire departments, during their recovery missions, for example for recovering injured persons from accident vehicles. The rescue devices may of course also be used during recovery missions or securing missions in buildings.

It is further also conceivable that such a rescue device is used, for instance, by the police or a special forces unit or the military, for example for opening apartment doors.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

Figure 1:
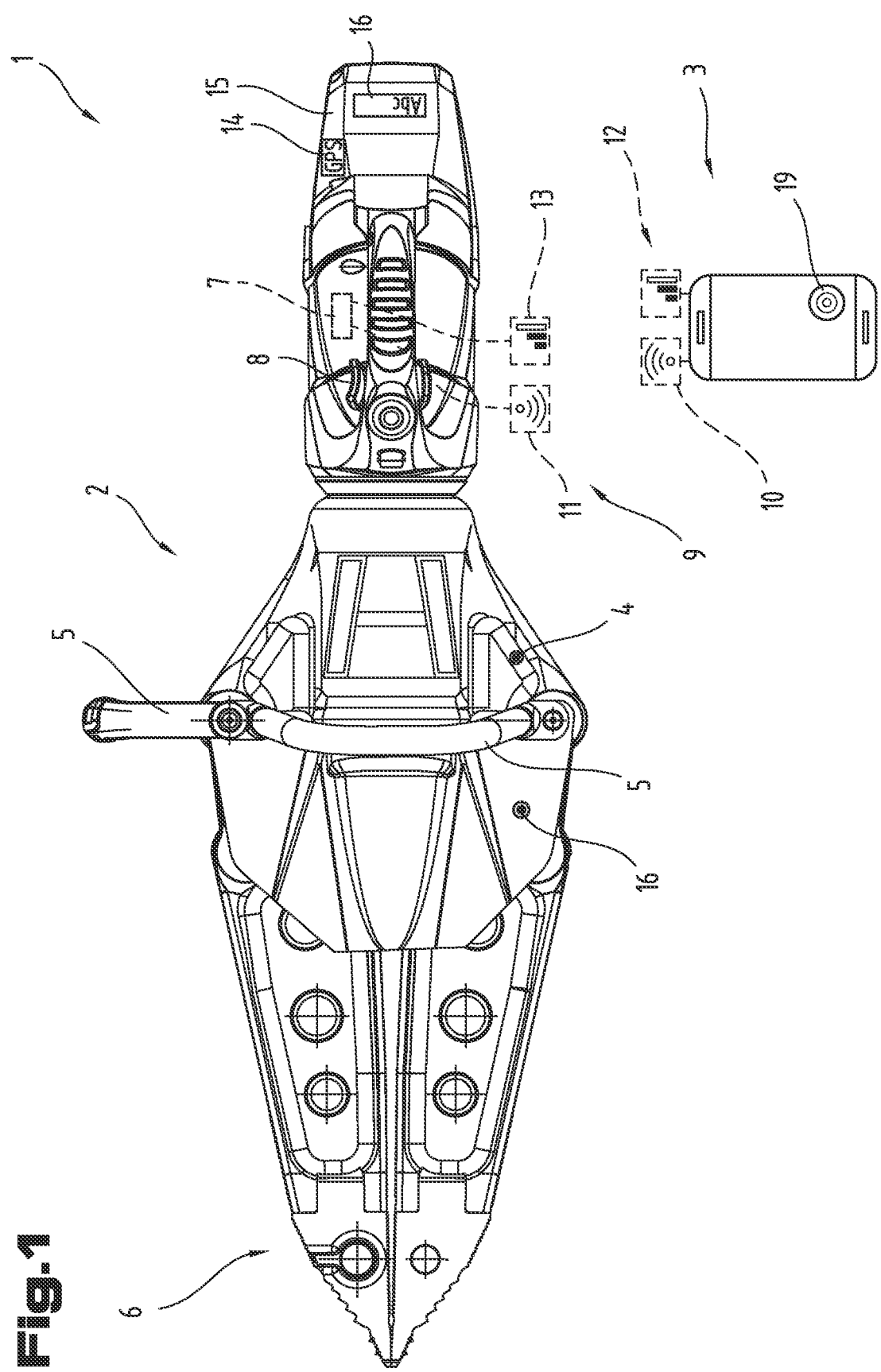
FIG. 1 shows a first embodiment of a rescue system with a mobile rescue device.

FIG. 1 shows a first embodiment of a rescue system 1 with a mobile rescue device 2 and an external additional input means 3. The mobile rescue device 2 comprises a base body 4 at which a handle 5 may be arranged and at which working means 6 are arranged for manipulation during the rescue mission. In addition, the mobile rescue device 2 comprises a controller 7, which is coupled with an input means 8. By means of the controller 7, control commands, which are entered by a device operator by means of the input means 8, are converted into corresponding signals in order to be able to move the working means 6 of the mobile rescue device 2.

Moreover, the mobile rescue device 2 comprises a main energy storage 15, for example in the form of a battery, and a drive unit, for example in the form of an electric motor.

The mobile rescue device 2 of the present embodiment is formed as a battery-operated mobile rescue device. In another embodiment, which is not shown, it is of course also conceivable that the mobile rescue device 2 has a base body 4, which is coupled with an external drive unit, for example by means of a hydraulic hose.

The rescue device 1 further comprises a data transmission means 9, by means of which data may be transmitted from the external additional input device 3 to the controller 7 of the mobile rescue device 2. As can be seen from the present embodiment according to FIG. 1, the data transmission means 9 may be configured as a wireless data transmission means 9. In an alternative embodiment, which is not shown, it is of course also conceivable that the external additional input means 3 is coupled with the mobile rescue device 2 by means of a wired data transmission means 9.

As can further be seen from FIG. 1, it may be provided that the data transmission means 9 has a first transmission unit 10, which is coupled with the external additional input means 3. In addition, the data transmission means 9 may have a first reception unit 11, which is coupled with the controller 7 of the mobile rescue device 2. Analogously, a second transmission unit 12 may be formed, which is coupled with the external additional input means 3 and interacts with a second reception unit 13, which is coupled with the controller 7 of the mobile rescue device 2.

As data transmission may not only be carried out in one direction but bidirectionally, it is of course also conceivable that the transmission units 10, 12 receive data packets sent by the reception units 11, 13. Moreover, it may be provided that the mobile rescue device 2 has a global position detection means 14, by means of which the geographic position of the mobile rescue device 2 may be detected. Moreover, it may be provided that the position detection means 14 is coupled with a position detection means energy storage 21. Furthermore, the position detection means energy storage 21 may be coupled with the main energy storage 15.

It is further also conceivable that the mobile rescue device 2 has an information display 16. The information display 16 may, for example, be arranged at the base body 4 of the mobile rescue device 2. As can be seen from FIG. 1, the information display 16 may be configured as a display on which a freely selectable text may be shown. In particular, it is conceivable that a predefined text is shown on the information display when the mobile rescue device 2 is stolen.

In an alternative embodiment, it is also conceivable that the information display 16 is configured as a simple display means, which is configured as a light, for example. In particular, it is conceivable in this regard that by means of the light, an optical signal is given, which is supposed to deter a thief or potential thief.

In addition, by means of the information display 16, the operator of the mobile rescue device 2 may, for example, be shown the battery status or other information.

As can be seen from the schematic representation according to FIG. 1, it may be provided that the external additional input means 3 is configured as a tablet or a mobile phone. In a device configured as external additional input means 3 specifically for this purpose, it is also conceivable that said device has specifically configured input buttons for inputting commands into the external additional input means 3.

Figure 2:
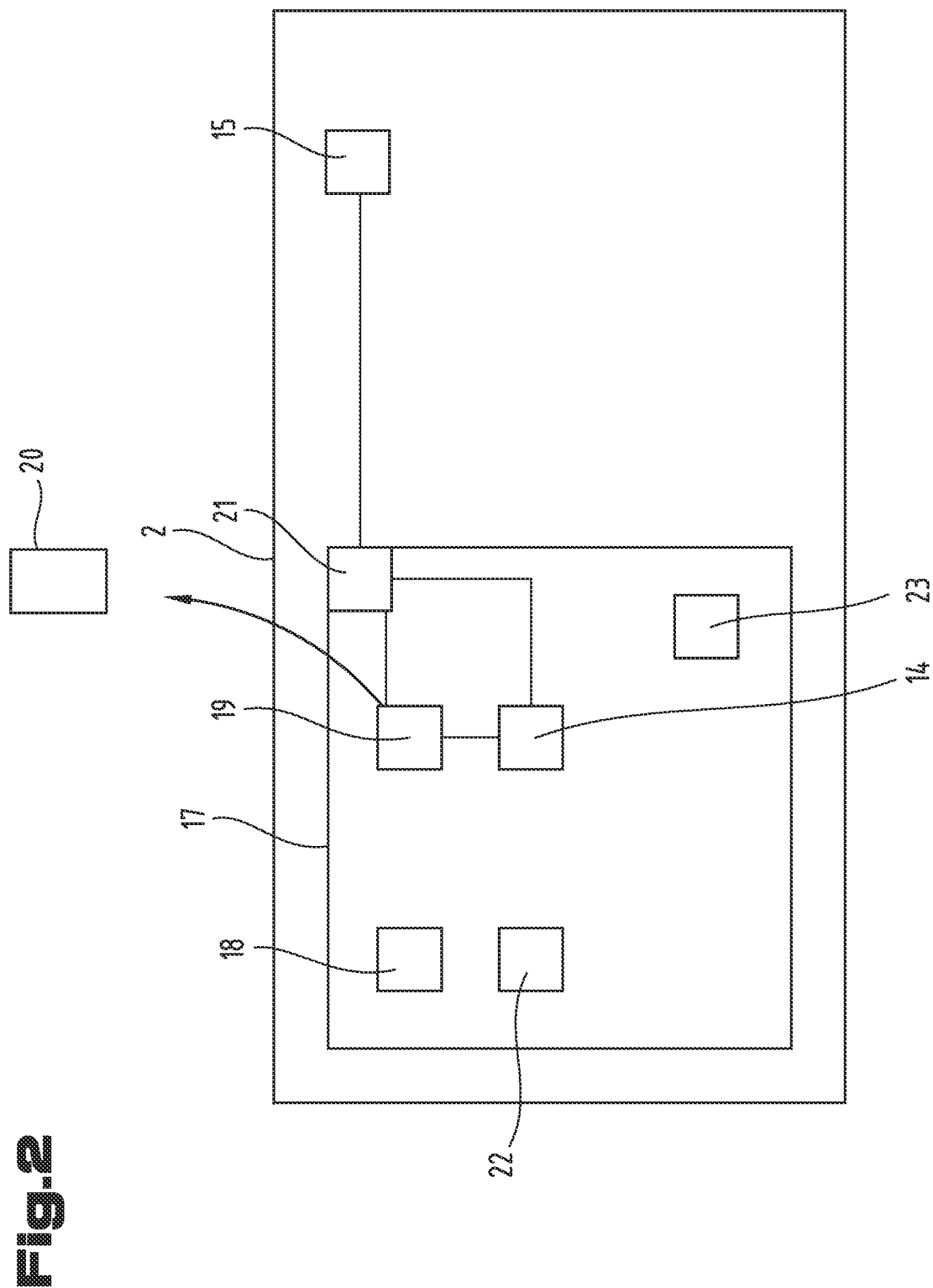
FIG. 2 shows a schematic representation of the individual components of the mobile rescue device.

FIG. 2 shows a schematic representation of the mobile rescue device 2 and its connection with attachments configured for theft protection. As can be seen from FIG. 2, it may be provided that a theft module 17 is formed. The theft module 17 may be formed as a structurally independent component. In an alternative embodiment, it may also be provided that the theft module 17 is integrated into the controller 7 of the mobile rescue device 2, for example.

As can further be seen from FIG. 2, it may be provided that the theft module 17 comprises a deactivation means 18, which is configured for deactivating the working means in the event of theft. The theft module 17 may further comprise a position transmission unit 19 for sending position data to a receiver 20. In this regard, any known data transmission technology may be used. It is further also conceivable that the receiver 20 is not a mobile device, such as a smartphone, tablet, laptop, a desktop PC or the like, but that the receiver 20 is a service on an online portal.

It may further be provided that the position transmission unit 19 is coupled with the position detection means 14. In this regard, the position transmission unit 19 may use any of the transmission technologies known to the person skilled in the art.

It may further be provided that the position detection means 14 and/or the position transmission unit 19 is coupled with a position detection means energy storage 21. Moreover, it may be provided that the theft module 17 comprises a motion sensor 22 for detecting a motion of the mobile rescue device 2.

It may further be provided that the deactivation means 18 is coupled with an unlocking receiver 23, which may be controlled from a central server. By means of the unlocking receiver 23, the deactivation means 18 may be switched to active mode. It is thus conceivable that the deactivation means 18 is active in general and the working means 6 is therefore not available. During a rescue mission, the deactivation means 18 may, for example, be switched to inactive mode directly via the alarm server, so that full functionality of the mobile rescue device 2 is available.

The embodiments show possible variations; however, it should be noted at this point that the invention is not limited to its variations specifically shown; rather, various combinations of the individual variations are possible, and this variation possibility based on the technical teaching of the present invention is subject to the skills of the person skilled in the art active in this technical field.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10, i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

Although only a few embodiments of the present invention have been shown and described, it is to be understood that many changes and modifications may be made thereunto without departing from the spirit and scope of the invention.

LIST OF REFERENCE NUMBERS

1 Rescue system
2 Mobile rescue device
3 External additional input means
4 Base body
5 Handle
6 Working means
7 Controller
8 Input means
9 Data transmission means
10 First transmission unit
11 First reception unit
12 Second transmission unit
13 Second reception unit
14 Global position detection means
15 Main energy storage
16 Information display
17 Theft module
18 Deactivation means
19 Position transmission unit
20 Receiver
21 Position detection means energy storage
22 Motion sensor
23 Unlocking receiver

What is claimed is:

1. A mobile rescue device comprising:
a base body;
a working means arranged at the base body, wherein the working means is configured to move for manipulation during a rescue mission; and
a switch or controller configured to disable the working means configured to move for manipulation during a rescue mission in the event of theft,
wherein the base body is configured to house at least in part the working means at the base body,
wherein the switch or controller for disabling the working means is installed inside the base body at which the working means is arranged, and
wherein the switch or controller is not accessible without using a tool, and
wherein by means of an external additional input device comprising an external input terminal and a transmission unit, a deactivation command is transmitted from the external additional input device to the switch or controller in order to disable the functionality of the working means in the theft scenario, wherein the deactivation command is based on a deliberate input by an operator into the external additional input device, so that the deliberate input by the operator is required to disable the functionality of the working means configured to move for manipulation during a rescue mission and prevents the functionality of the working means during a rescue mission from being automatically disabled.

2. The mobile rescue device according to claim 1, wherein at the mobile rescue device, a position detection means is formed.

3. The mobile rescue device according to claim 1, wherein the position detection means is coupled with a transceiver configured for sending to a receiver a position signal detected by means of the position detection means.

4. The mobile rescue device according to claim 3, wherein a motion sensor is formed, by means of which the position detection means and/or the transceiver may be activated.

5. The mobile rescue device according to claim 1, wherein the position detection means and/or the transceiver is installed inside the base body and not accessible without using a tool.

6. The mobile rescue device according to claim 1,
wherein the position detection means is coupled with a position detection means energy storage, which is coupled with a main energy storage; and
wherein the main energy storage serves for supplying the driving energy for the driving means.

7. The mobile rescue device according to claim 1, wherein the switch or controller is coupled with an unlocking receiver, which may be controlled from a central server.

8. The mobile rescue device according to claim 1, wherein the mobile rescue device comprises a spreading device, a cutting device, or a combined device having a spreading and a cutting function and is configured to exert a force sufficient to plastically deform machines or open apartment doors.

9. A method for theft protection of a mobile rescue device having a base body and a working means arranged at the base body, wherein the working means is configured to move for manipulation during a rescue mission, the method comprising:
in a method step of a theft scenario, disabling the functionality of the working means configured to move for manipulation during a rescue mission of the mobile rescue device by a switch or controller which is configured for disabling the working means configured to move for manipulation during a rescue mission,
wherein the base body is configured to house at least in part the working means at the base body,
wherein the switch or controller is installed inside the base body and not accessible without using a tool, and
wherein by means of an external additional input device comprising an external input terminal and a transmission unit, a deactivation command is transmitted from the external additional input device to the switch or controller in order to disable the functionality of the working means in the theft scenario, wherein the deactivation command is based on a deliberate input by an operator into the external additional input device, so that the deliberate input by the operator is required to disable the functionality of the working means configured to move for manipulation during a rescue mission and prevents the functionality of the working means during a rescue mission from being automatically disabled.

10. The method according to claim 9, wherein in the theft scenario, position data on the current location of the mobile rescue device is detected by means of a position detection means.

11. The method according to claim 9, wherein the theft scenario is activated when the position detection means detects that the mobile rescue device is moved outside predefined limits of movement and the functionality of the working means is automatically disabled.

12. The method according to claim 9, wherein by means of an external additional input means, a deactivation command is transmitted to the switch or controller in order to disable the functionality of the working means in the theft scenario.

13. The method according to claim 12, wherein for reactivating the functionality of the working means, an electronic key is required.

14. The method according to claim 12, wherein for reactivating the functionality of the working means, entering a code is required.

15. The method according to claim 9, wherein by means of an external additional input means, an activation command is transmitted to the switch or controller for reactivating the functionality of the working means after the theft scenario has been terminated.

16. The method according to claim 9, wherein when the theft scenario is activated, a notification is automatically transmitted to a receiver.

17. The method according to claim 9, wherein when the theft scenario is activated, the position data on the current location of the mobile rescue device is automatically transmitted to a receiver.

18. The method according to claim 9, wherein when the theft scenario is activated, an optical and/or acoustic signal is emitted by the mobile rescue device.

19. The method according to claim 9, wherein the mobile rescue device comprises a spreading device, a cutting device, or a combined device having a spreading and a cutting function and is configured to exert a force sufficient to plastically deform machines or open apartment doors.

20. A method for theft protection of a mobile rescue device having a base body and a working means arranged at the base body, wherein the working means is configured to move for manipulation during a rescue mission, the method comprising:
in a method step of a theft scenario, disabling the functionality of the working means configured to move for manipulation during a rescue mission of the mobile rescue device by a switch or controller,
wherein by means of an external additional input device comprising an external input terminal and a transmission unit, a deactivation command is transmitted from the external additional input device to the switch or controller in order to disable the functionality of the working means in the theft scenario, wherein the deactivation command is based on a deliberate input by an operator into the external additional input device, so that the deliberate input by the operator is required to disable the functionality of the working means configured to move for manipulation during a rescue mission and prevents the functionality of the working means during a rescue mission from being automatically disabled due to a software error.

21. The method according to claim 20, wherein the external additional input device comprises a tablet or a mobile phone.

* * * * *